Sept. 22, 1942.   W. E. BEGLEY, SR   2,296,492
LEAKPROOF CHECK OR PUMP VALVE
Filed May 2, 1940
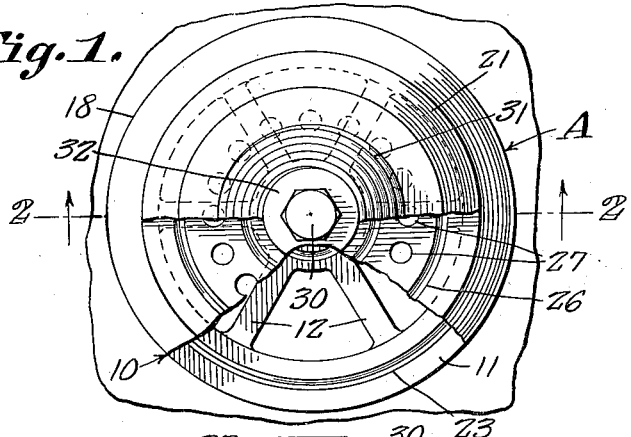
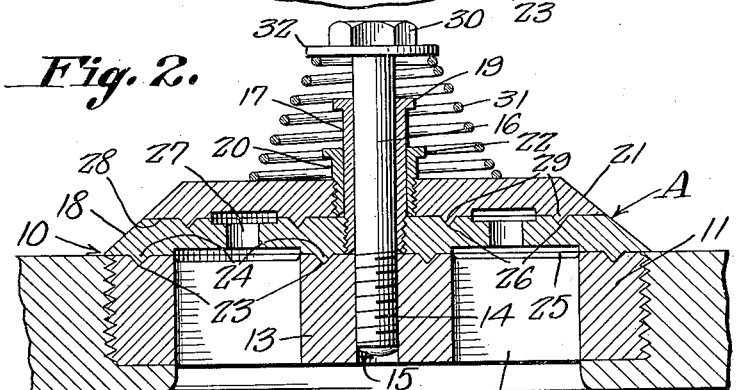
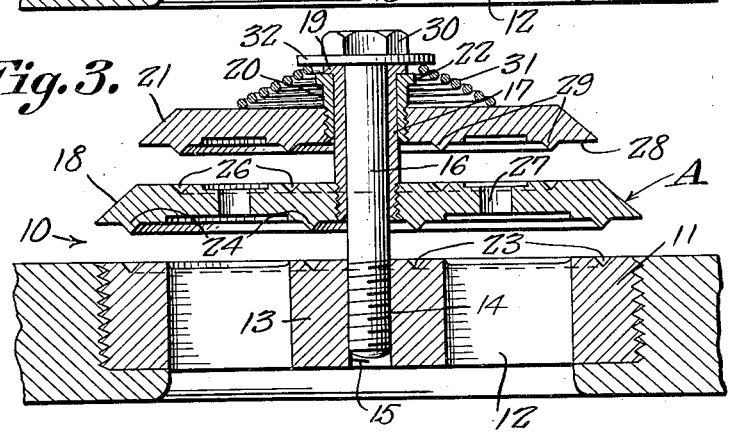
William E. Begley, Sr. Inventor
By _____ Attorney Patented Sept. 22, 1942

2,296,492

UNITED STATES PATENT OFFICE 2,296,492

LEAKPROOF CHECK OR PUMP VALVE

William E. Begley, Sr., Alton, Ill.

Application May 2, 1940, Serial No. 333,037

1 Claim. (Cl. 251—144)

The invention relates to valves and more especially to duplex lift valves for pumps or the like.

The primary object of the invention is the provision of a valve of this character, wherein the construction of the same enables the closing of such valve without any noisy slap and when closed will be leak-proof.

Another object of the invention is the provision of a valve of this character, wherein a perfect seating of the same is assured due to the peculiar baffle arrangement present in the structure.

A further object of the invention is the provision of a valve of this character, wherein repairs and adjustments may be effected with ease and dispatch.

A still further object of the invention is the provision of a valve of this character, wherein the construction thereof permits the use of the same with compressors, ordinary water pumps, being effective as a check valve, vacuum breaker and is usable on oil pumps or most any other types of machines where a valve may be required.

A still further object of the invention is the provision of a valve of this character, which is extremely simple in construction, thoroughly reliable and efficient in operation, strong, durable, quick acting, and inexpensive to manufacture and install.

With these and other objects in view the invention consists in the features of construction, combination and arrangement of parts as will be hereinafter more fully described in detail, illustrated in the accompanying drawing, which discloses the preferred embodiment of the invention, and pointed out in the claim hereunto appended.

In the accompanying drawing:

Figure 1 is a fragmentary top plan view of the valve assembly constructed in accordance with the invention and parts thereof being broken away for illustrative purposes.

Figure 2 is an enlarged sectional view taken on the line 2—2 of Figure 1 looking in the direction of the arrows.

Figure 3 is a view similar to Figure 2 showing the parts in an adjusted or changed position.

Similar reference characters indicate corresponding parts throughout the several views in the drawing.

Referring to the drawing in detail, A designates generally the valve assembly constructed in accordance with the invention and comprises a ring member 10, the outer annulus 11 of which through radial spokes 12 is joined with a central hub 13 provided with a bolt hole 14 having the threads 15 for the engagement therewith of a bolt 16.

Slidably fitting the bolt 16 is the central sleeve 17 of a disk valve body 18. The sleeve 17 is formed at its outer end with a stop flange 19. Slidable on the sleeve 17 is the central sleeve 20 of a second disk valve body 21. The sleeve 20 at its outer end is formed with a stop flange 22 cooperating with the flange 19 under the assembly of the sleeves 17 and 20, both being detachably engaged with the valve bodies 18 and 21, respectively.

The valve body 18 is of greater size than the valve body 21 and the sleeve of said body 18 is longer than the sleeve 20 of the body 21, so that the said valve body 21 will have a determined movement toward and from the valve body 18, while the latter will have a determined movement toward and away from the coupling ring 10 against which it is adapted to be seated in the working of the valve assembly A. The valve body 18 is adapted to be seated against the valve body 21 in the working of the valve assembly A.

In the annulus 11 of the member 10 and in the hub 13 of the latter are formed inner and outer concentrically disposed annular substantially V-shaped grooves 23 which accommodate correspondingly shaped concentrically arranged inner and outer annular ribs forming baffles 24 when the valve body 18 is seated upon the member 10. These baffles 24 are on the under or bottom face 25 of the valve body 18 and the grooves 23 are in the upper face of the member 10.

The valve body 18 has formed in its upper face concentrically arranged annular substantially V-shaped grooves 26, while between the latter, which are spaced from each other, are spaced perforations or apertures 27.

At the under face 28 of the valve body 21 are spaced concentrically arranged annular substantially V-shaped ribs 29 forming baffles thereon. These ribs 29 are adapted to fit the grooves 26 when the valve body 21 is seated upon the valve body 18, and when the latter is seated on the member 10 the valve assembly A is completely closed.

The bolt 16 is of a length to have its head 30 sufficiently removed from the member 10 so that both valve bodies 18 and 21 will have relative movement with respect to each other and to the said member 10 in the operation of the valve assembly A for the perfect opening and closing thereof.

Disposed about the sleeves 17 and 20 and the bolt 16 is a convoluted spring 31 which is seated against the body 21 and also against an abutment washer 32 at the headed end of the bolt 16. This spring normally holds the valve bodies 18 and 21 seated or the valve assembly in a closed condition. However, the spring 31 may be entirely dispensed with and in this arrangement the valve bodies 18 and 21 will gravitate to closing positions.

The baffle and groove formations create a cushioning effect during the closing operation of the valve assembly A, and there will be no noisy slapping of the valve bodies 18 and 21 during the working of said assembly.

The presence of the baffles and grooves in the peculiar formation thereof assures a perfect seating of the valve bodies 18 and 21, respectively, throughout the entire working life of the valve assembly.

The valve assembly A constructed as hereinbefore set forth is leak-proof. There is no liability of either valve body 18 and 21 hanging slightly open when present with the ribs and grooves as before explained in that such bodies will settle to seating positions. There can be no leakage in the valve assembly A around the sleeves or bolt, by the arrangement of the baffles and grooves. The baffles and grooves effect the righting of the valve bodies when seating and guide the same to seating positions.

What is claimed is:

A valve of the kind described, comprising a ring member including a central perforated hub, an annulus concentric thereto and radial spokes joining the hub and annulus for effecting fluid passages therebetween, superposed separable disks of approximately equal areas and thicknesses disengageably contacting each other, the lowermost of said disks and said ring member having contacting faces, said lowermost disk being provided with through passages opening into recesses in the opposite faces of said lowermost disk, a headed bolt removably fitting the perforation in the hub, sleeves of different lengths on the bolt, telescoping with each other, detachably connected with the disks and constituting runners for the latter, stops on the sleeves for cooperation with the head of the bolt for limiting relative movements of the disks with respect to the ring member, a single spring means seated against the head of the bolt and the uppermost disk, and rigid knife edge ribs on said disks concentrically arranged with respect to each other for interfitting respectively with corresponding grooves in the lower disk and in the ring member, for encirclement of the hub perforation and the said passages in the ring member to avoid leakage about the same, said contacting faces of the disks and the ring member together with the ribs being effective as a positive seal therebetween.

WILLIAM E. BEGLEY, Sr.